United States Patent Office.

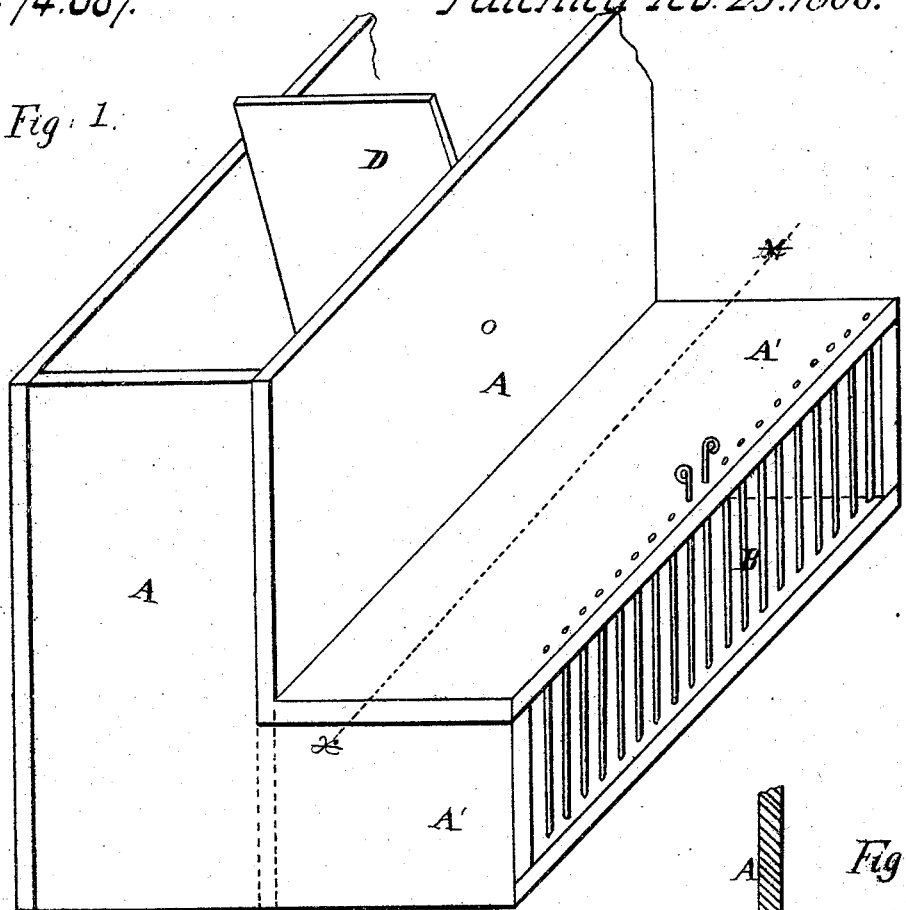
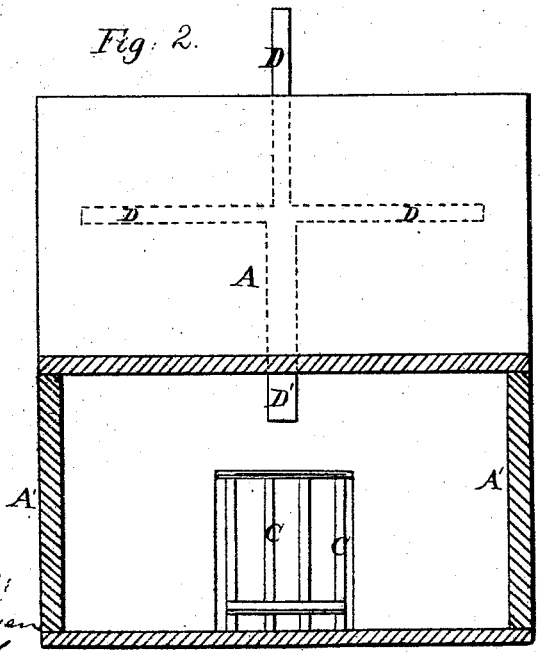
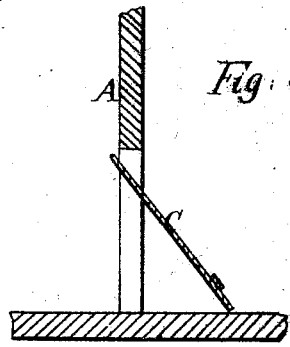

MANLOVE BUTLER, OF VERNON, INDIANA.

*Letters Patent No. 74,887, dated February 25, 1868.*

---

IMPROVED ANIMAL-TRAP.

---

The Schedule referred to in these Letters Patent and making part of the same.

---

TO ALL WHOM IT MAY CONCERN:

Be it known that I, MANLOVE BUTLER, of Vernon, in the county of Jennings, and State of Indiana, have invented a new and useful Improvement in Animal-Traps; and I do hereby declare that the following is a full, clear, and exact description of the same, reference being had to the annexed drawings, making part of this specification, in which—

Figure 1 is a perspective view.

Figure 2 is a vertical section on the line $x\ x$; and

Figure 3 a vertical section of the inner door.

The same letters are employed in all the figures in the indication of the same parts.

My invention consists in a new arrangement of an animal-trap, in which the animal falls from an oscillating-wheel, maintained in the same position by a weight attached to one of its wings, into a chamber, where it is confined, and from which it cannot escape.

The following description will enable one skilled in the art to construct my improved trap.

A is the case of the trap, divided into two compartments by an intermediate partition. The smaller and front compartment is closed by bars B, the animal entering the larger compartment, into which he will be attracted by the apparent possibility of escaping through an inclined door, C, pivoted to the side of an opening through the partition, so that an animal pushing against it, it will easily be raised, so as to permit its passage into the small compartment, and falling when it has passed, prevent its return. The larger compartment is open above, except as it is closed by the wings of an oscillating-wheel, D, the shaft of which turns on journals secured to the sides of the case. One wing, D', of this wheel is made thicker than the others, or weighted so as to always hold the wheel in the same position when at rest. The bait being attached to the vertical upper wing, or to the top of one of the horizontal ones, the animal enticed thereby, jumping on to the horizontal wings, its weight will cause the wheel to revolve enough to cause the animal to fall into the bottom of the compartment under the wheel. As soon as its weight is taken from the wing, the wheel will be brought back to its original position, by the weight of the loaded wing D'. As this is effected without noise, nothing occurs to alarm other animals on the outside of the trap, and the trap is instantly reset.

What I claim as my invention, and desire to secure by Letters Patent, is—

An animal-trap, constructed with the parts A A', B, C, and D, arranged as described, the oscillating-wheel D being constructed with one loaded wing D', so as to act by gravity only, substantially in the manner set forth.

In testimony whereof, I have signed my name to this specification in the presence of two subscribing witnesses.

MANLOVE BUTLER.

Witnesses:
BENJ. C. BAKER,
JAMES M. HILL.